June 29, 1937.  J. J. TRÉBUCIEN  2,085,483
AIRCRAFT PROPELLING DEVICE
Filed Nov. 12, 1935
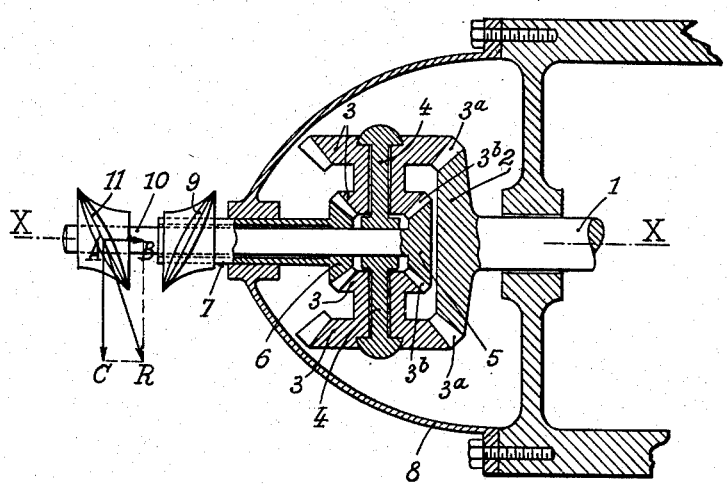
J. J. Trébucien
INVENTOR
By: Glascock Downing & Seebold
Attys.

Patented June 29, 1937

2,085,483

UNITED STATES PATENT OFFICE 2,085,483

AIRCRAFT PROPELLING DEVICE

Jean Jacques Trébucien, Paris, France

Application November 12, 1935, Serial No. 49,395
In France December 4, 1934

1 Claim. (Cl. 170—165)

The invention relates to aircraft propelling devices, and it has for its object to eliminate the reacting torque occuring in the known propelling devices.

It is known that the tractive or propulsive aircraft propellers impart to the driving shaft a reaction torque which is due to the action of the air streams upon the propeller blades. This torque depends upon the direction of the air streams with reference to the blades, that is, upon the speed of rotation of the propeller and of the velocity of the relative wind with reference to the aircraft, which depends in turn upon the speed of translation of the aircraft. This reaction torque tends to tilt the aircraft about the extension of the axis of the propeller.

Attempts have been made to obviate this drawback by the combination of two propellers, which are positively driven at the same speed but in contrary directions. However, this method is not satisfactory, because the complete elimination of the resulting torque can only be attained provided the reacting torques of the two propellers shall be constantly equal and of contrary directions. However, this is by no means the case, owing to variations of the aerodynamic conditions when departing from the speed for which the propellers have been designed and which is determined, in particular, by a determined speed of the propellers and by a given rectilinear speed of the aircraft. Thus, when starting and landing, the relative wind is less for the front propeller than for the rear propeller the latter being constantly subjected to the current of air created by the front propeller. For this reason, except for the normal rate of speed above indicated, the two reaction torques are unequal, and the problem of the elimination of the reaction torque has not been solved, or at least only imperfectly.

The present invention has for its object a propelling device for aircraft, which will assure, at all speeds, complete elimination of the reaction torque. With this object in view, the invention comprises two propellers which are rotated in contrary directions and are connected to a common driving shaft, in such manner that the speed ratios between said shaft and the respective propellers will be variable, and that, owing to the variation of said speed ratios, the two reacting torques shall be constantly equal, at all speeds of flight.

In a preferred embodiment of the invention, the two propellers are connected to the common driving shaft by a differential mechanism. The sun gears, for example, are adapted to rotate in unison with the respective propellers, and the planetary pinions, which are loosely rotatable on their journals, the latter carried by a spider loosely rotatable about the axis of the driving shaft, are driven by a bevel gear which rotates in unison with the driving shaft.

The accompanying drawing, which is given solely by way of example, is a diagrammatic section of a propelling device according to the invention.

In the embodiment illustrated in the drawing, the driving shaft 1 actuates a bevel gear 2, which is keyed to or is integral with said shaft. Bevel gear 2 meshes with the toothings $3^a$ of a plurality of planetary pinions 3 which are loose on their journals 4. These latter form a spider which is freely rotatable about the axis of shaft 10. Each planetary pinion 3 comprises two sets of teeth $3^a$ and $3^b$. The teeth $3^a$ of the different planetary pinions engage bevel gear 2, and the teeth $3^b$ of each planetary pinion engage two opposite sun gears 5 and 6. Sun gear 6 is keyed to or is integral with a tubular shaft 7 which is centered in the casing 8 and to which is keyed the rear propeller 9. Sun gear 5 is keyed to or is integral with a shaft 10 guided in tubular shaft 7 and extending outwardly of the latter, and it carries the front propeller 11.

The characteristics of the two propellers are so determined that the propellers will rotate at equal speeds in contrary directions, when the speed of the aircraft has a certain value $V^t$.

At each point, such as A, of propeller 11, which propeller is designed for a linear speed $V^t$ corresponding to the normal operating speed, the direction of the relative wind is AR, that is the resultant of a vector AB which is equal to $V^t$ but is of contrary sign, and of a vector AC equal to the peripheral speed $V^c$ of the propeller at the point A, but in the contrary direction.

For the normal operating speed, the two propellers 11 and 9 will by construction produce two equal reacting torques. In these conditions, the planetary pinions 3 will turn upon their own axes, and the spider carrying journals 4 is stationary. The two propellers 11 and 9 are driven at the same speed and in contrary directions.

When the speed of translation becomes less than $V^t$, for example upon starting or landing, the direction of the relative wind (resultant AR) at each point such as A of the propeller 11 has a different direction, as vector AB now has a value which is less that $(-V^t)$. All takes place as if the incidence of the blades of the propeller 11 were above its normal value. Hence the corresponding reaction torque will increase, while this is not true for the rear propeller 9, which is subjected to the relative wind of the first propeller, i. e., practically in the normal operating conditions.

However, as the reaction torques due to the two propellers tend to assume different values, the spider 4 will turn about the axis X—X; the speeds of the two propellers become different, the speed of propeller 11, decreasing and the speed of propeller 9 increasing, until the two reaction torques attain values which are equal but in contrary directions. In fact, these torques are constantly equal. The speed ratios between the shaft 1 and the propellers will vary as soon as said torques tend to assume different values.

Said apparatus provides for a better stability of the aircraft, and an increased efficiency of the propelling device, owing to the fact that the propeller 9 operates at different speeds which are very near the normal conditions; there is consequently no reduction of the speed of the engine.

Obviously, the invention is not limited to the embodiment herein described and represented, which is given solely by way of example.

Having now particularly described and ascertained the nature of my said invention and in what manner the same is to be performed, I declare that what I claim is:

An aircraft propelling device comprising in combination a driving shaft, a driving pinion rigidly connected with said driving shaft, a pair of propellers of reverse pitches, a driven shaft in line with said driving shaft and rigidly connected with one propeller, a tubular shaft surrounding said driven shaft and rigidly connected with the other propeller, two sun gears respectively secured to said driven and said tubular shafts, a freely rotatable spider coaxial with said shafts, and loose planetary pinions rotatably supported by said spider and having two toothings one of which is in mesh with both sun gears and the other in mesh with said driving pinion.

JEAN JACQUES TRÉBUCIEN.